United States Patent [19]

Tuzson

[11] 4,216,677
[45] Aug. 12, 1980

[54] HERMETICALLY SEALED ROTARY DRIVE APPARATUS

[75] Inventor: John J. Tuzson, Evanston, Ill.

[73] Assignee: Borg-Warner Corporation, Chicago, Ill.

[21] Appl. No.: 925,149

[22] Filed: Jul. 17, 1978

[51] Int. Cl.² ............................................. F16J 15/50
[52] U.S. Cl. ........................................ 74/17.8; 74/63; 74/640
[58] Field of Search ................... 74/17.8, 63, 645, 650, 74/655, 640; 417/61, 76, 902

[56] References Cited

U.S. PATENT DOCUMENTS

| 2,497,867 | 2/1950 | Cymmer | 74/17.8 |
|---|---|---|---|
| 2,943,495 | 7/1960 | Musser | 74/17.8 |
| 3,049,931 | 8/1962 | Lang, Jr. et al. | 74/17.8 |
| 3,077,792 | 2/1963 | Kinderman | 74/17.8 X |
| 3,190,227 | 6/1965 | Davids et al. | 74/17.8 X |
| 3,196,713 | 7/1965 | Robinson | 74/640 |
| 3,208,289 | 9/1965 | Hutter et al. | 74/63 X |
| 3,283,597 | 11/1966 | Doll | 74/17.8 |
| 3,835,717 | 9/1974 | Rudolph | 74/63 X |

*Primary Examiner*—James T. McCall
*Attorney, Agent, or Firm*—Julian Schachner

[57] ABSTRACT

Rotary drive apparatus includes coaxial inner and outer shaft portions. One portion supports a pair of bearings on axes offset from the shaft axis. The other portion supports rotatable bearing rings offset from the shaft and bearing axes, but in alignment with the bearings. A flexible sealing member is oriented between the two shaft portions and is non-rotatable. Band contact between the bearings, the flexible sealing member, and the rings due to Hertzian stress results in absorption of stress forces over a wide area, thus reducing wear.

9 Claims, 2 Drawing Figures

HERMETICALLY SEALED ROTARY DRIVE APPARATUS

BACKGROUND OF THE INVENTION

This invention relates generally to the transmission of power. More particularly it relates to rotary drive apparatus which is hermetically sealed, which compensates for appreciable shaft misalignment, and which is particularly useful in a generally inaccessable environment.

In submersible pump applications the motor shaft seal is a frequent source of failure. Face seals are sensitive to installation procedures, shaft runout, vibration and other factors which are often difficult to control. A submersible pump is inaccessable, and seal failure cannot easily be detected or repaired. Usually this leads to catastrophic failure of an entire unit. In such an application it would be desirable to have some mechanism transmitting shaft power through an impermeable, hermetically sealed stationary barrier. Other applications in which such a mechanism would be advantageous include, for example, nuclear pumps and systems incorporating freon.

It is known to provide harmonic drive devices for the transmission of power. A disadvantage of using known harmonic drive devices is that the flexible tube or so-called flex-spline must withstand a torque which is equal to the output torque. This is a particular problem in that speed reduction is involved.

There remains a need in the art for hermetically sealed rotary drive apparatus which provides positive, nonslip drive, which compensates for shaft misalignment, which incorporates a hermetic barrier, which does not experience a torque reaction other than that developed by friction torque, which is simple and easy to manufacture, install and operate, and which need not require a speed reduction.

SUMMARY OF THE INVENTION

A primary object of this invention is the provision of hermetically sealed rotary drive apparatus which will solve these problems. The apparatus includes a shaft having an end portion on which anti-friction rolling elements are supported on axes offset from the shaft axis. A flexible sealing member is non-rotatably positioned relative to the anti-friction rolling elements. Another shaft having an annular end portion is positioned relative to the flexible sealing member and accommodates rotatable rings which are in alignment with the rolling elements. Upon rotation of one shaft, power is transferred through the flexible sealing member to the other shaft.

BRIEF DESCRIPTION OF THE DRAWING

The objects and advantages of this invention will become apparent to those skilled in the art upon careful consideration of the specification herein, including the drawing, wherein.

Figure 1:
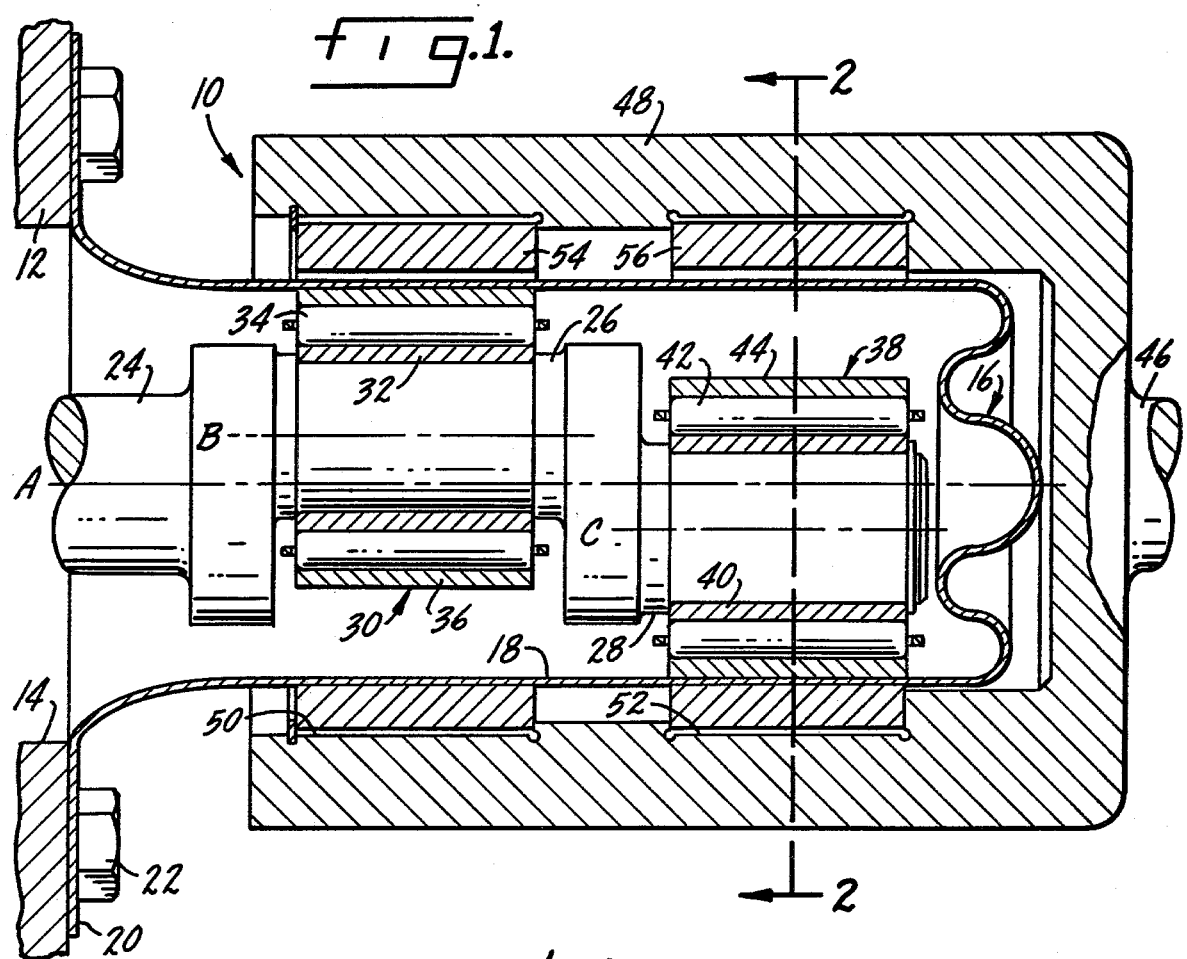
FIG. 1 is an elevational view, partly in section, showing the rotary power drive apparatus.

While this invention is susceptible of embodiment in many different forms, there is shown in the drawing and herein will be described in detail a preferred embodiment. It should be understood that the present disclosure is considered to be an exemplification of the principles of the invention, and is not intended to limit the invention to this embodiment.

DESCRIPTION OF THE PREFERRED EMBODIMENT

Referring now to the drawing in greater detail, there is shown an improved hermetically sealed rotary drive mechanism 10. This drive mechanism 10 includes a stationary member 12 which may be, for example, the housing of a pump, motor, compressor or the like. Housing 12 defines an opening 14. A flexible sealing member 16 in the form of a bonnet includes a can portion 18 and a flange portion 20 at the open end thereof. Suitable bolts 22 or the like extend through flange portion 20 to secure bonnet 16 to housing 12. Bonnet 16 is non-rotatable relative to housing 12, and forms a hermetic seal over opening 14.

Bonnet 16 preferably is formed from a thin, high-grade metal or from a polymer. In one of its forms, bonnet 16 may be an elastomer such as, for example, teflon. Bonnet 16 has the characteristic of being flexible and yet providing hard running surfaces.

A shaft 24 is journalled in a conventional bearing, not shown, for rotation on a shaft axis A relative to housing 12. Shaft 24 extends through opening 14 and defines a pair of crank portions 26 and 28. Crank portion 26 has an axis B offset from axis A. Similarly, crank portion 28 has an axis C offset from axis A. In one preferred form of the invention, axes B and C are equally offset from axis A along the same line, but on opposite sides of axis A.

Anti-friction rolling elements 30 in the form of a roller bearing or the like is supported by crank portion 26 on axis B. Roller bearing 30 includes an inner race 32 secured to crank portion 26, a plurality of rollers 34, and an outer race 36 contiguous to the inner surface of can portion 18 of bonnet 16. Similarly, anti-friction rolling elements 38 in the form of a roller bearing or the like is supported by crank portion 28 on axis C. Roller bearing 38 includes an inner race 40 secured to crank portion 28, a plurality of rollers 42, and an outer race 44 contiguous to the inner surface of can portion 18 of bonnet 16. As clearly shown in FIG. 2, the orientation of bearings 30 and 38 is such as to cause can portion 18 of bonnet 16 to flex out of its normally round configuration. In one preferred form of the invention, bearings 30 and 38 are full-complement roller bearings. However, it should be understood that design consideration may require the use of other types of bearings.

A shaft 46 is rotatable on axis A and has an annular end portion 48 which is telescopically received over can portion 18 of bonnet 16. End portion 48 defines annular, internally facing grooves 50 and 52. A pair of annular bearing rings 54 and 56 are received in grooves 50 and 52, and are rotatable respectively on axes D and E. In one preferred form of the invention, axes D and E are equally offset from axis A along the same line, but on opposite sides of axis A. Further, the line defined by axes D and E is perpendicular to the line defined by axes B and C. Although bearing rings 54 and 56 are shown in solid form, it should be understood that design considerations may require the use of other types of bearings.

Mechanism 10 may drive in either direction. For example, if shaft 24 is the input shaft of a pump, drive would be from shaft 46 through mechanism 10 to shaft 24. On the other hand, if shaft 24 is the output shaft of a motor, drive would be from shaft 24 through mechanism 10 to shaft 46. An important consideration is the lubricating properties of the fluids encountered, for example in a submersible pump. End portion 48 of shaft 46 should be expected to have less severe lubrication requirements. Furthermore, the geometry of end portion 48 would provide more favorable heat transfer than would that of crank portions 26 and 28 of shaft 24.

Figure 2:
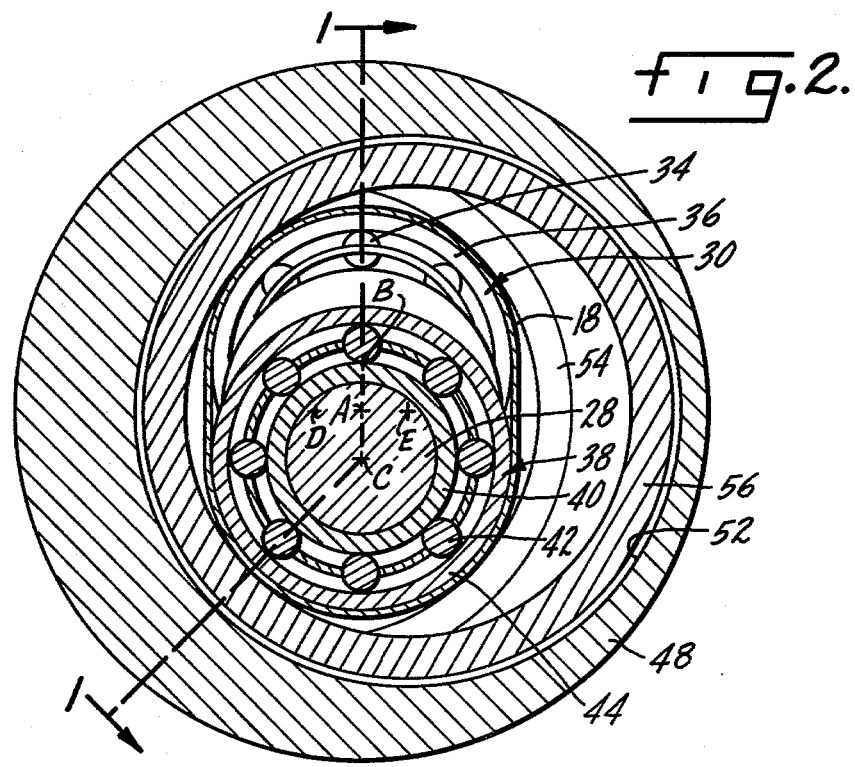
FIG. 2 is a sectional view taken along the line 2—2 of FIG. 1 showing additional details of the rotary power drive apparatus.

With reference to FIG. 2, assume shaft 46 is an input and is rotated. End portion 48 rotates about axis A and carries with it bearing rings 54 and 56, the axes of which describe circles about axis A having radii AD and AE. Bearing ring 56 causes can portion 18 of bonnet 16 to flex continuously in the shape depicted in FIG. 2. Can portion 18 rolls relative to bearing ring 56, which in turn is free to roll relative to end portion 48. Outer race 44 of bearing 38 rolls on the inner surface of can portion 18, thereby causing a crank effect which acts through crank portion 28 to rotate shaft 24 on axis A. In a similar manner bearing ring 54 causes can portion 18 of bonnet 16 to flex continuously in the shape depicted in FIG. 2. Can portion 18 rolls relative to bearing ring 54, which in turn is free to roll relative to end portion 48. Outer race 36 of bearing 30 rolls on the inner surface of can portion 18, thereby causing a crank effect which acts through crank portion 26 to rotate shaft 24 on axis A.

Torque is transferred from shaft 46 to shaft 24 through end portion 48, bearing rings 54 and 56, can portion 18, bearings 30 and 38, and crank portions 26 and 28. There is a theoretical line contact between bearing rings 54 and 56 and the outer surface of can portion 18, as well as between the inner surface of can portion 18 and outer races 36 and 44. Due to the large radii of curvature of the contacting surfaces of bearings 30 and 38 and rings 54 and 56, the practical effect of the arrangement disclosed herein is band contact due to Hertzian stress, rather than line contact. As a result, stress forces are absorbed over a larger area than would otherwise obtain in the theoretical case, and wear is considerably reduced. Of course, this would be the case as well if shaft 24 were the input and shaft 46 the output.

An important advantage of the symmetrical arrangement of the cranks, bearings and rings is that reaction forces are balanced to a large extent, thus minimizing bearing loads.

In one preferred form of the invention, shafts 28 and 46 are coaxial. However, the arrangement herein compensates for appreciable shaft misalignment without developing significant loads on bearings 30 and 38. In addition, the mechanism disclosed herein is capable of damping out shaft vibrations to an appreciable extent. Another advantage of this arrangement is that it provides axial freedom so that shafts 24 and 46 are self-adjusting in the axial direction.

As noted above, bonnet 16 is flexible and may be formed from a metal or a polymer. A polymer in the form of an elastomer may be advantageous in some applications in that the elastomer is deformable. Bonnet 16 hermetically seals opening 14 of housing 12 and yet allows for the positive transmission of torque between shafts 24 and 46. This positive transmission of torque results from the offset relationship of bearings 30 and 38, which preferably are complementary, the flexibility of can portion 18 of bonnet 16, and the offset relationship of rings 54 and 56.

While a preferred embodiment of the invention has been shown and described, this should be considered as illustrative and may be modified by those skilled in the art. It is intended that the claims herein cover all such modifications as may fall within the spirit and scope of the invention.

What is claimed is:

1. Rotary power drive apparatus comprising first and second shafts rotatable on a first axis, a non-rotatable flexible sealing member having first and second surfaces, first means supported by said first shaft for rotation on a second axis offset from said first axis, said first means being in rolling contact with said first surface along a band, and second means supported by said second shaft for rotation on a third axis offset from said first and second axes, said second surface being in rolling contact with said second means along a band.

2. The invention of claim 1, said first shaft defining at least one crank portion, and said first means being at least one bearing supported by said crank portion on at least one second axis offset from said first axis.

3. The invention of claim 2 said second shaft defining an annular portion, and said second means being supported in said annular portion in alignment with said first means.

4. The invention of claim 3, said annular portion defining at least one annular groove, and said second means being at least one ring rotatably supported in said groove in alignment with said one bearing.

5. The invention of claim 1, said first and second axes defining a first line, and said first and third axes defining a second line, said lines being perpendicular.

6. The invention of claim 4, said first and second axes defining a first line, and said first and third axes defining a second line, said lines being perpendicular.

7. The invention of claim 6, said flexible sealing member being formed from a metal.

8. The invention of claim 6, said flexible sealing member being formed from a polymer.

9. The invention of claim 8, said polymer being an elastomer.

* * * * *